United States Patent
Uneta et al.

(10) Patent No.: US 6,880,526 B2
(45) Date of Patent: Apr. 19, 2005

(54) INTAKE SYSTEM FOR INTERNAL COMBUSTION ENGINE

(75) Inventors: Hisashi Uneta, Saitama (JP); Seiji Adachi, Saitama (JP); Hideki Noritake, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/609,416

(22) Filed: Jul. 1, 2003

(65) Prior Publication Data

US 2004/0094125 A1 May 20, 2004

(30) Foreign Application Priority Data

Jul. 5, 2002 (JP) ........................................ 2002-196783

(51) Int. Cl.[7] ................................................. F02B 31/08
(52) U.S. Cl. ............. 123/432; 123/188.14; 123/184.37; 123/184.45; 123/184.52
(58) Field of Search ..................... 123/308, 188.14, 123/432, 184.37, 184.45, 184.52, 184.55

(56) References Cited

U.S. PATENT DOCUMENTS

| | | | |
|---|---|---|---|
| 4,381,738 A | * | 5/1983 | Shaffer .................. 123/184.32 |
| 4,553,507 A | * | 11/1985 | Shaffer .................. 123/184.34 |
| 4,972,814 A | * | 11/1990 | Matsuki et al. ............. 123/308 |
| 5,220,899 A | * | 6/1993 | Ikebe et al. ................. 123/308 |
| 5,575,263 A | * | 11/1996 | Pontoppidan et al. ....... 123/432 |
| 5,915,354 A | * | 6/1999 | Ma ............................. 123/308 |

FOREIGN PATENT DOCUMENTS

| | | |
|---|---|---|
| JP | 11166420 A | 6/1999 |
| JP | 2000-145467 A | 5/2000 |

* cited by examiner

*Primary Examiner*—Erick Solis
(74) *Attorney, Agent, or Firm*—Birch, Stewart, Kolasch & Birch, LLP

(57) ABSTRACT

An intake system for an internal combustion engine in which the inflow characteristic of a mixture of gas is varied by a partition wall provided replaceably in an intake port opening, whereby the output characteristic of the internal combustion engine is regulated to a desired condition, and a vehicle having appropriate operating characteristics is provided. A replaceable partition wall A is mounted in an intake port opening 1a of an internal combustion engine. The partition wall A is composed of a plate P that differs in length as compared to other plates. The plate P is inserted into an upper-lower pair of grooves provided in the intake port opening 1a, whereby the plate P is replaceably mounted, and the inflow characteristic of a mixture of gas sucked in through the intake port opening 1a is varied by replacement of the plate P thus mounted, whereby the output characteristic of the internal combustion engine is regulated to a desired condition.

19 Claims, 4 Drawing Sheets

INTAKE SYSTEM FOR INTERNAL COMBUSTION ENGINE

CROSS-REFERENCE TO RELATED APPLICATIONS

The present non-provisional application claims priority under 35 USC 119 to Japanese Patent Application No. 2002-196783 filed on Jul. 5, 2002 the entire contents thereof is hereby incorporated by reference.

BACKGROUND OF THE INVENTION

1. Field of the Invention

The present invention relates to an intake system for an internal combustion engine. More particularly, to an improvement in an intake system for internal combustion engine in which a partition wall for modifying the inflow characteristic of a mixture of gas supplied into an intake port to a predetermined condition is replaceably mounted in an intake port opening, and the inflow characteristic of the mixture of gas is modified from the predetermined condition to another condition, whereby the output characteristic of the internal combustion engine is appropriately regulated, thereby giving an optimum vehicle operating characteristic.

2. Description of Background Art

Hithertofore, as an intake system of a 4-stroke cycle internal combustion engine, there has been known a technology in which the inflow characteristic of a mixture of gas supplied is controlled to a special condition, thereby to achieve an enhancement in the combustion efficiency in the internal combustion engine and an improvement in the exhaust gas characteristics.

For example, Japanese Patent Laid-open No. Hei 11-166420 discloses a technology in which an intake passage on the downstream side of a throttle valve is partitioned by a partition wall into upper and lower portions as a high-load passage and a low-load passage, and at the time of low load when the opening of the throttle valve is small, the mixture of gas flows in from the low-load passage along an intake port upper wall of a cylinder head, whereby a tumble due to intake gas is generated in the cylinder, and stirring of the mixture of gas is promoted, thereby achieving stabilization of combustion and an improvement in the exhaust gas characteristics at the time of the low-load operation.

In addition, Japanese Patent Laid-open No. 2000-145467 discloses a technology in which a tumble composed of circular streams flowing in two directionalities is generated in the cylinder due to a mixture of gas and air flowing into the cylinder via an intake outlet, thereby contriving stabilization of combustion at the time of low-load operation, and the mixture of gas flows through a high-load passage and a low-load passage, whereby the mixture of gas is supplied via the intake outlet of an intake port into the cylinder in a large quantity, thereby contriving enhancement of output at the time of high-load operation.

This prior art relates to an internal combustion engine with a high intake efficiency and an enhanced output, in which the inflow characteristic of the mixture of gas is controlled to a special condition, whereby the combustion efficiency in the cylinder is improved, thereby contriving enhancement of the output characteristic of the internal combustion engine. As a result, an enhancement in the operating characteristics of the vehicle is contrived by an improvement in fuel consumption in the internal combustion engine and an improvement in the output characteristics of the engine.

Meanwhile, the operating characteristics of the vehicle vary depending on differences in operating conditions in the operating of the vehicle, even if there is no difference in the output characteristic itself of the engine of the vehicle. For example, the operating characteristics vary depending on differences in the road conditions and the rider's driving skill. Particularly, variations in the road conditions are diverse ranging from a slippery road surface at the times of rainfall, snowfall and road surface freezing to a dried-out road surface condition at the time of fine weather, and the rider's driving skill varies greatly from person to person. Thus, the operating characteristics of the vehicle vary greatly depending on variations and differences in the various conditions attendant on the operating of the vehicle. Accordingly, it is desired to develop and improve an internal combustion engine that can be changed in the specifications thereof according to the variations and differences in the various conditions in the operating of the vehicle, i.e., the road conditions, driving skill, etc.

From the viewpoint of the prior art referred to above, the development and improvement of technology according to the prior art resides in the enhancement of the operating characteristics of the vehicle that is contrived through an improvement in the output characteristic of the internal combustion engine, as described above. However, the prior art does not take into consideration the measure to cope with variations and differences in the various conditions in the operating of the vehicle.

For example, referring to the above-mentioned points from the structural features of the internal combustion engine according to the prior art, in the prior art the special control of the inflow characteristic of the mixture of gas sucked into the cylinder is performed by the partition wall provided in the intake passage as a fixed structure, the special control of the inflow characteristic of the mixture of gas is utterly invariable on a structural basis, the control of the inflow characteristic of the mixture of gas is always conducted under fixed conditions, and the regulation of the output characteristic of the internal combustion engine is conducted under fixed conditions. Thus, the specifications of the engine are not modified according to variations and differences in the various conditions in the operating of the vehicle.

Therefore, in the above-mentioned situations, it is desired to develop and improve an internal combustion engine having specifications that can be modified for coping with variations and differences in the various conditions on the operating of the vehicle, namely, various modified conditions on the operating of the vehicle. In practice, however, the development and improvement of such an internal combustion engine are difficult to achieve due to an increase in cost, and it is being desired to find a good measure to improve the internal combustion engine which makes it possible to meet the above-mentioned request by a simple structural modification and at low cost. At present, however, there has not been found any good measure to meet the above request.

SUMMARY AND OBJECTS OF THE INVENTION

The present invention, in the above-mentioned situations, provides a measure to meet the above request, and provides an improving technology for the internal combustion engine that has specifications capable of being modified for coping with various modified conditions on the operating of the vehicle by a simple structural modification of the internal combustion engine and at low cost. According to the present invention, there is provided an intake system for an internal combustion engine, that includes at least two intake valves, a passage through which a mixture of gas is supplied to each of the intake valves, a passage separating partition wall provided in the passage for supplying each of the mixture of gas respectively to each of the intake valves, and an intake port opening into which the mixture of gas is taken in so as to supply the mixture of gas into the passage, wherein a partition wall for bisecting the intake port opening is mounted in the intake port opening oppositely to the passage partition wall for supplying each of the mixture of gas respectively to each of the intake valves, in such a manner as to be replaceable with other partition wall.

According to the present invention, there is provided an intake system for an internal combustion engine, including at least two intake valves, a passage through which a mixture of gas is supplied to each of the intake valves, a passage separating partition wall provided in the passage for supplying each of the mixture of gas respectively to each of the intake valves, and an intake port opening into which the mixture of gas is taken in so as to supply the mixture of gas into the passage, wherein a partition wall for bisecting the intake port opening is mounted in the intake port opening oppositely to the passage partition wall for supplying each of the mixture of gas respectively to each of the intake valves, in such a manner as to be replaceable with another partition wall. Therefore, with the partition wall replaced with another partition wall as required, the inflow characteristic of the mixture of gas taken in through the intake port opening is modified by the partition wall, and, with the mixture of gas supplied into the cylinder of the internal combustion engine, regulation of the combustion condition is contrived, whereby the output characteristic of the internal combustion engine is regulated so as to give a desired appropriate vehicle operating characteristic.

According to the present invention, the partition wall is replaceably mounted so as to bisect the intake port opening is composed of one of plates differing from each other in length. Therefore, in addition to the effects of the present invention as described above, the inflow characteristic of the mixture of gas can be easily modified because the length of the partition wall bisecting the intake port opening is changed by replacement of the plate, and the mounting of the partition wall and handling of the partition wall are easy because the structure for mounting the partition wall into the intake port opening consists in mounting of the plate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, an embodiment of the present invention will be described below based on the drawings.

Figure 1:
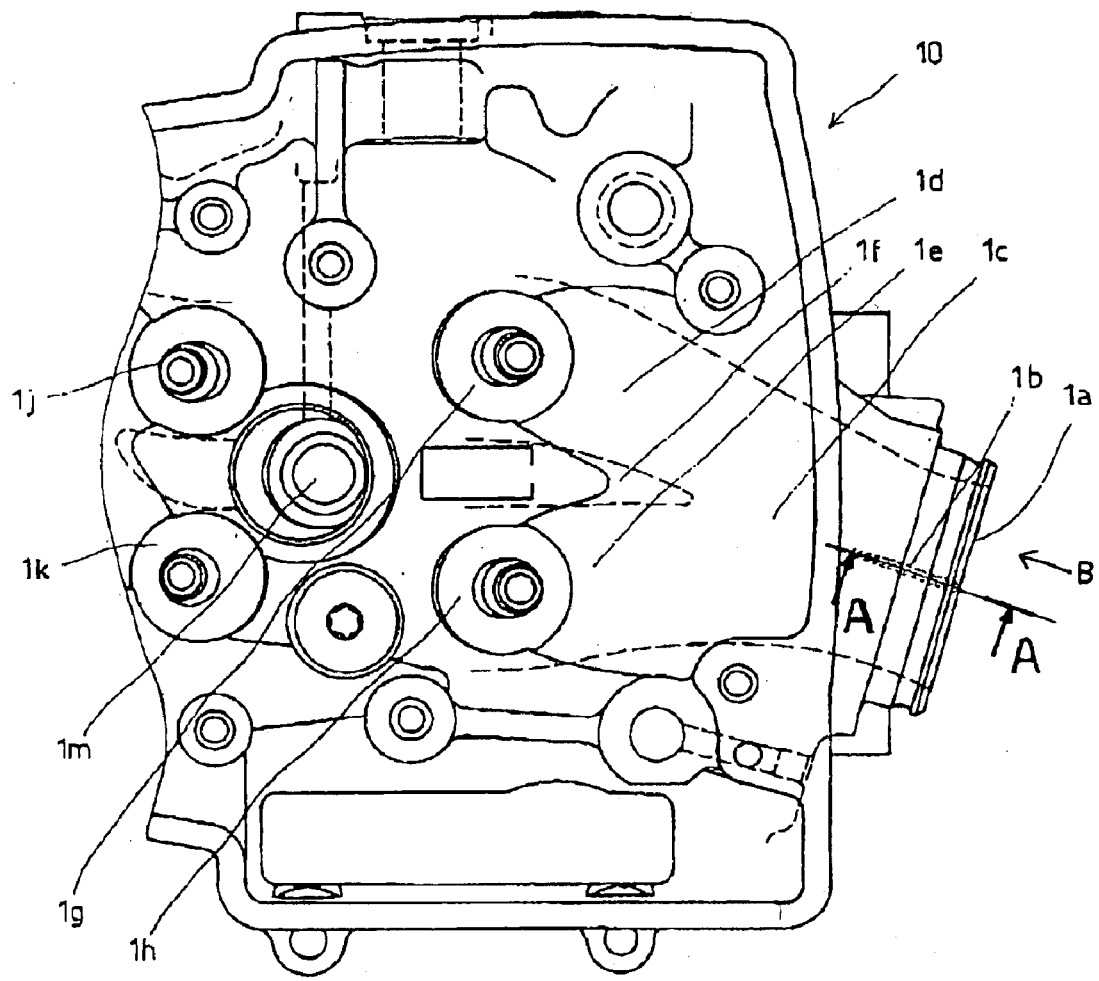
FIG. 1 shows a cylinder head portion of an internal combustion engine according to the present invention.

FIG. 1 shows a cylinder head 10 of an internal combustion engine as viewed from above. In the cylinder head 10, two intake valves 1g and 1h and two exhaust valves 1j and 1k are shown. In addition, an igniter 1m is shown between the intake valves 1g, 1h and the exhaust valves 1j, 1k. Further, as illustrated to the right portion of FIG. 1, an in-intake-port passage 1c is in communication with the two intake valves 1g, 1h, and an intake port opening 1a which is an inlet to the passage 1c.

A mixture of gas flowing from a throttle valve of a carburetor not shown flows in through the intake port opening 1a. The mixture of gas is led through the in-intake-port passage 1c and the two intake valves 1g, 1h into the cylinder not shown. The in-intake-port passage 1c extends as a single passage with a predetermined length from the intake port opening 1a, and is branched into two branch passages 1d and 1e by a partition wall 1f disposed at a predetermined position in the passage 1c. The mixture of gas is led through the two branch passages 1d and 1e respectively to the two intake valves 1g and 1h.

Figure 2:
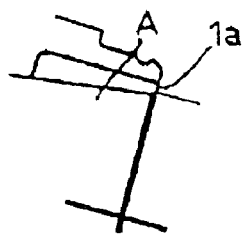
FIG. 2 is a sectional view taken along line A—A of FIG. 1 according to the present invention.
Figure 3:
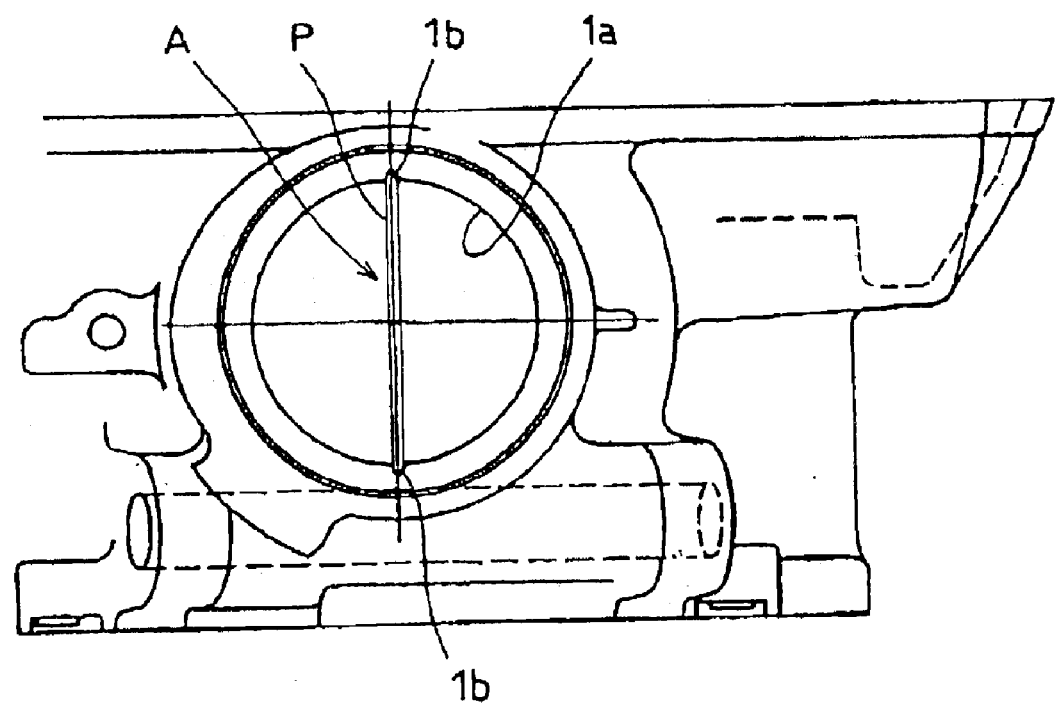
FIG. 3 shows the cylinder head portion according to the present invention, as viewed in the direction of arrow B.

In addition, as shown in FIGS. 1 to 3, the intake port opening 1a is provided with groove portions 1b for a plate P constituting a partition wall A with a predetermined length for separating the opening 1a into left and right portions. A pair of the groove portions 1b are provided at upper and lower symmetrical positions of the intake port opening 1a so that the opening 1a is separated into left and right portions by the partition wall constituted of the plate P. Each of the pair of groove portions 1b extends over a predetermined distance from an end of the opening 1a to the inside of the in-intake-port passage 1c.

Figure 4A:
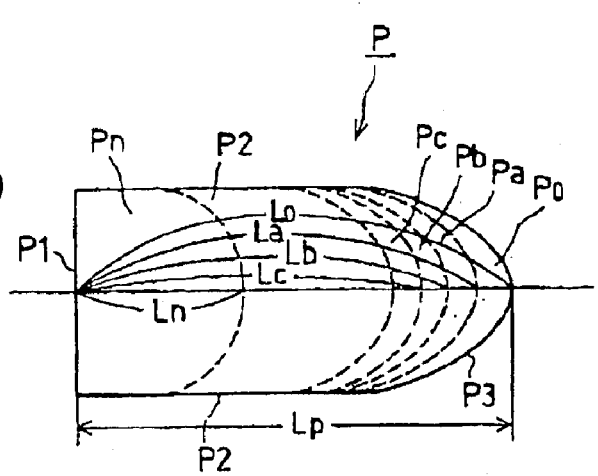
FIGS. 4(a) to 4(e) shows a plate according to the present invention.
Figure 4B:
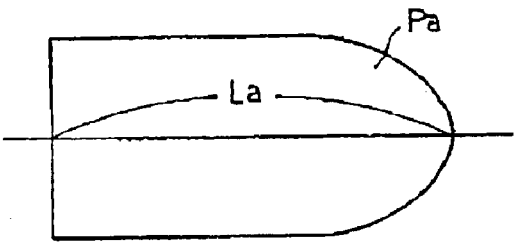
Figure 4C:
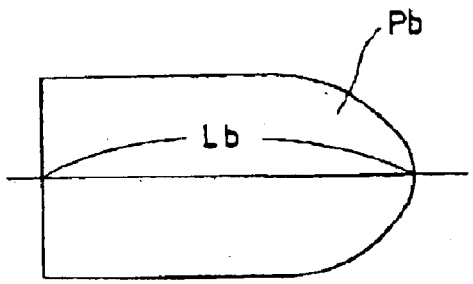
Figure 4D:
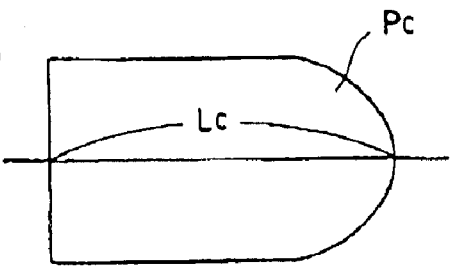
Figure 4E:
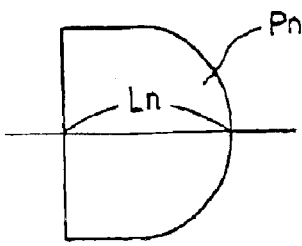

The plate P for constituting the partition wall A is appropriately formed of a plate material such as a steel plate having a predetermined thickness. As shown in FIG. 4(a), the plain surface shape of the plate P consists of a base straight line portion P1 in a straight line form, a pair of parallel straight line extended portion P2 extend as parallel straight line portions with a predetermined length from both ends of the straight line portion P1, and a roughly arcuate curved line portion P3 through which the respective tip ends of the pair of parallel straight line extending portions P2 are connected to each other. The plate P is a plate form body having an overall length of Lp.

The insertion and holding of the plate P are conducted by inserting the pair of parallel straight line extended portions P2 into the upper-lower pair of opposite groove portions 1b provided in the intake port opening 1a so that the side of the roughly arcuate curved line portion P3 of the plate P is the leading end that is inserted. The insertion of the plate P is carried out until the base straight line portion P1 becomes flush with the opening end of the intake port opening 1a. Thereafter, the plate P is fixed by an appropriate fixing means not shown, whereby the plate P is held in the inserted condition.

The plate P thus inserted and held can be detached for replacement thereof with another plate P. In this meaning, the fixation of the plate P by the fixing means is not permanent fixation. However, in the fixed condition of the plate P, it must be ensured that the mounting position of the plate P would not be staggered and the plate P would not be disengaged due to a slackening generated by vibration of the internal combustion engine or the like.

Now, the plate P in the embodiment of the present invention will be described more in detail below.

The plate P is formed by working a steel plate or the like with an appropriate thickness by a working means such as stamping, and the plain surface shape thereof has the above-mentioned shape shown in FIG. 4(a). The plate P shown in FIG. 4(a) is a plate having a predetermined length Lp. With the plate $P_0$ in which the length Lp of the plate P is $L_0$ as a standard, the plate $P_0$ is cut to an appropriate length for obtaining an engine output characteristic controlled to a desired appropriate condition, namely, to each of lengths indicated by dotted lines in FIG. 4(a), for example, each of lengths La, Lb, Lc, . . . Ln to be used as each of plates Pa, Pb, Pc, . . . Pn, as illustrated in FIGS. 4(b) to 4(e). Alternatively, the plate $P_0$ is not cut and is used as the plate $P_0$ as it has the length $L_0$.

Therefore, each of the plates Pa, Pb, Pc, . . . Pn shown in FIGS. 4(b) to 4(e) and the plate $P_0$ not directly shown in FIGS. 4(b) to 4(e) is the plate P prepared for obtaining the desired engine output characteristic. The plate $P_0$ is the plate P which has not been cut, and each of the plates Pa, Pb, Pc, . . . Pn is a plate P which has been formed by cutting the plate $P_0$ as the standard to a predetermined length.

Figure 5:
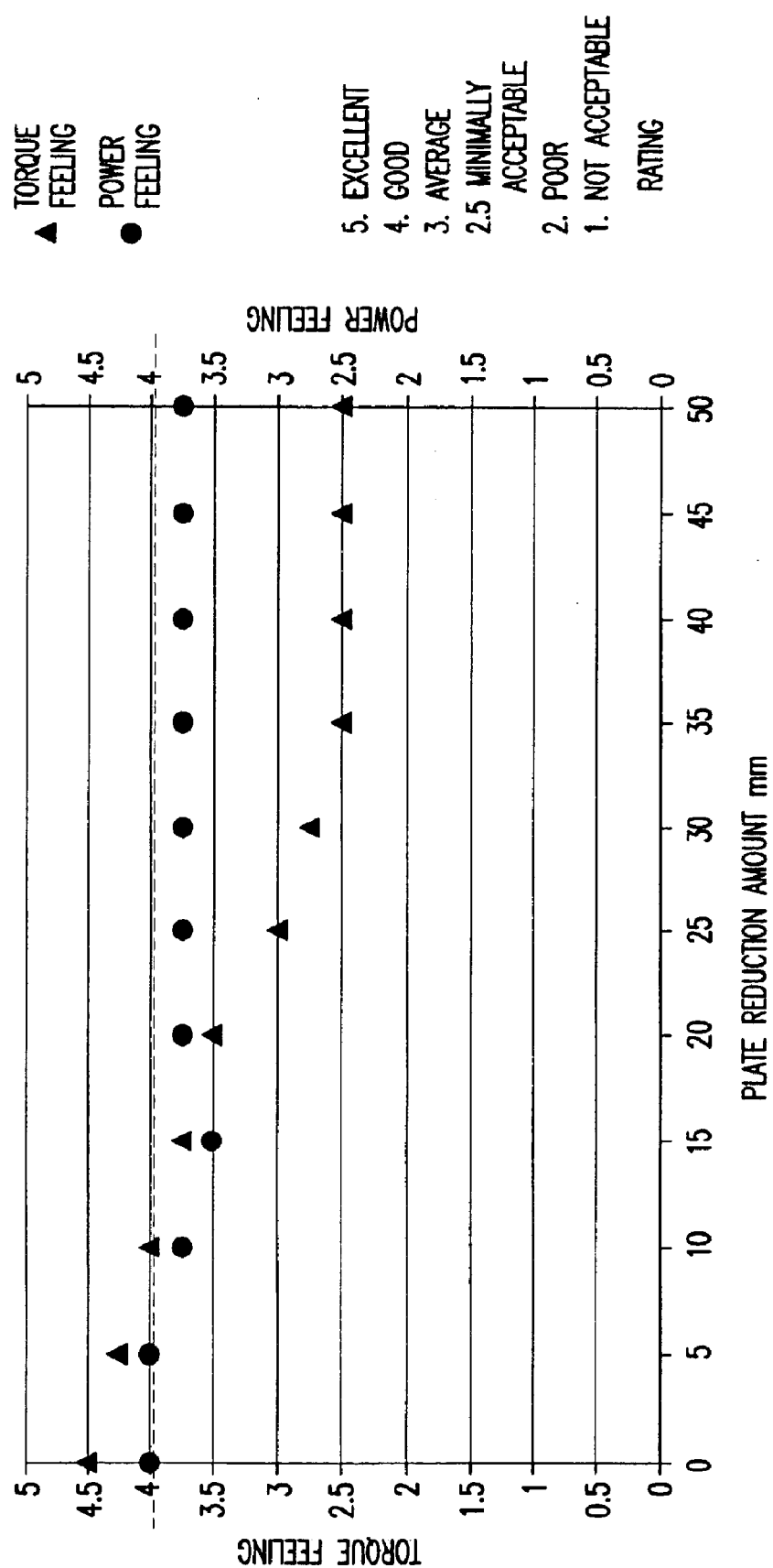
FIG. 5 is a diagram showing the relationships between the plate reduction amount and the torque feeling and power feeling according to the present invention.

The respective lengths $L_0$, La, Lb, Lc, . . . Ln of the plates P are appropriately set based on the relationships between the plate reduction amount (cutting amount of the plate P, more precisely, the cutting amount for the plate $P_0$ constituting the standard) and the torque feeling and power feeling in the operating of the vehicle which are shown in FIG. 5 and will be detailed later.

The plates P in the embodiment of the present invention have the structure as described above, and are used in correspondence with various modified conditions on the operating of the vehicle as described above. Specifically, correspondingly to the modified conditions, an appropriate correlationship with the torque feeling and power feeling corresponding to the conditions is selected, and a plate length Lp based on the selection is set. For example, one of the plate lengths La, Lb, Lc, . . . Ln and further $L_0$ and the like is set, and the plate Pa, Pb, Pc, . . . Pn or $P_0$ or the like corresponding to the set length is used. One plate having a predetermined length is selected from among the set-length plates Pa, Pb, Pc, . . . Pn, the selected plate is mounted in the intake port opening 1a of the internal combustion engine, and the inflow characteristic of the mixture of gas sucked in through the opening 1a is modified by the plate P having the predetermined length, whereby regulation of the combustion condition in the cylinder is contrived, and the output characteristic of the internal combustion engine is set to an engine specification corresponding to the modified conditions.

Namely, the partition wall A is constituted of the plate P mounted in the intake port opening 1a, the inflow characteristic of the mixture of gas sucked in through the opening 1a is modified by the partition wall A, or by the plate P having the predetermined length, whereby regulation of the combustion condition in the cylinder is contrived, and the output characteristic of the internal combustion engine is regulated. Thus, there is obtained an internal combustion engine whose specifications are modified correspondingly to the various modified conditions on the operating of the vehicle.

Meanwhile, a detailed description of the setting of the length of the plate P has not yet been made. Here, the setting of the length of the plate P will be described based on FIG. 5.

The relationships between the length of the plate P mounted in the intake port opening 1a and the torque feeling and power feeling at the time of operating of the vehicle obtained from the variation in the output characteristic of the internal combustion engine, i.e., the relationships between the variation in the length of the plate P and the variations in the torque feeling and power feeling at the time of operating of the vehicle obtained from the output characteristic of the internal combustion engine upon the variation in the plate length are clearly described based on FIG. 5 which is based on the data obtained by the present inventors. Both types of quantities are in the following relationships.

Namely, FIG. 5 shows the correlationships between the length of the plate P expressed as a plate reduction amount, i.e., the cutting amount for the plate $P_0$ with the length $L_0$ constituting the standard and the torque feeling and power feeling at the time of operating of the vehicle obtained from the characteristic of the internal combustion engine. The torque feeling and power feeling in FIG. 5 express the torque intensity and power intensity obtained from the feelings of the operator obtained by the operator during operating of the vehicle. In the five levels of rating, 5.0 indicates excellent, 4.0 indicates good, 3.0 indicates average, 2.0 indicates poor, and 1.0 indicates ng, not acceptable.

FIG. 5 shows how the torque feeling and power feeling vary according to the change in the reduction amount of the plate P, i.e., according to the change in the setting of the length of the plate P. The length of the plate P for obtaining the desired torque feeling and power feeling is set based on FIG. 5.

In other words, it is shown that the desired torque feeling and power feeling can be obtained by use of the plate P having the set length.

As is clear from FIG. 5, when the plate $P_0$ with the length $L_0$ is used, the torque feeling is 4.5 and the power feeling is 4.0. With this as a standard, when the plate reduction amount is in the vicinity of 15 mm, i.e., when the plate length is shorter than the length of the plate $P_0$ by 15 mm, the torque feeling is 3.75 and the power feeling is 3.5. When the plate reduction amount is in the vicinity of 30 mm, i.e., when the plate length is shorter than the length of the plate $P_0$ by 30 mm, the torque feeling is 2.75 and the power feeling is 3.75. When the plate length is shorter than the length of the plate $P_0$ by 45 mm, the torque feeling is 2.5 and the power feeling is 3.75.

The overall tendency of the relationships between the plate reduction amount and the torque feeling and power feeling is as follows. Until the reduction amount reaches the vicinity of 15 mm, the torque feeling and power feeling tend to decrease with an increase in the reduction amount. When the reduction amount is in the range from 15 mm to about 20 mm, the torque feeling decreases rapidly. Thereafter, the torque feeling maintains a value of about 2.5. The power feeling varies a little when the reduction amount is in the range of 15 mm to about 20 mm. Thereafter, the power feeling is at an intermediate value between about 3.5 and 4.0.

Since the relationships between the length Lp of the plate P mounted in the intake port opening 1a and the torque feeling and power feeling at the time of operating of the vehicle obtained from the feelings of the rider are as described above, in correspondence with the various modified conditions on the operating of the vehicle, appropriate torque feeling and power feeling corresponding to the conditions are appropriately selected based on FIG. 5.

Then, the plate reduction amount, or the cutting amount for the plate $P_0$ constituting the standard, based on the selection of the torque feeling and power feeling is determined, the plate P with the length Lp corresponding to the cutting amount is set, and the plate P with the set length is mounted in the intake port opening 1a.

Namely, in correspondence with the road conditions and differences in the operator's driving skill and the like, i.e., in correspondence with various modified conditions on the operating of the vehicle such as a slippery road surface condition due to rainfall, snowfall, freezing or the like, a dried-out road surface condition, and the operator's driving skill, optimum torque feeling and power feeling corresponding to the conditions are selected based on FIG. 5.

The torque feeling and power feeling are selected, the length Lp of the plate member P to be mounted in the intake port opening 1a of the engine is set from the plate reduction amount based on the selection, and the plate P with the set length is mounted in the intake port opening 1a, whereby the output characteristic of the engine is regulated appropriately.

Since the embodiment shown in FIGS. 1 to 5 of the present invention is constituted as described above, in correspondence with various modified conditions on the operating of the vehicle, appropriate torque feeling and power feeling corresponding to the conditions are selected, the reduction amount of the plate P attendant on the selection is determined from FIG. 5, the plate $P_0$ constituting the standard is cut according to the reduction amount or is not cut to be set as the plate Pa, Pb, Pc, . . . Pn or $P_0$ with a predetermined length La, Lb, Lc, . . . Ln or $L_0$, and the plate P thus set is mounted in the intake port opening 1a of the internal combustion engine, whereby the partition wall A is formed in the opening 1a, the inflow characteristic of the mixture of gas sucked in through the opening 1a is modified by the partition wall A, and the output characteristic of the internal combustion engine is regulated appropriately. In this manner, an internal combustion engine capable of being modified in specification correspondingly to the various modified conditions on the operating of the vehicle can be provided.

A variety of embodiments may be contemplated in place of the above-described embodiment.

While the plate P has been formed of a steel plate or the like in the above embodiment, the plate P may be formed of other metallic material, for example, a plate material of a comparatively lightweight metal such as aluminum and an aluminum alloy, or may be formed by use of a plate material of a resin having a high thermal resistance or the like.

While the plate P has been used by cutting the plate $P_0$ as the standard according to the desired engine performance in the above-described embodiment, the plate P may be used by selecting a plate closest to the plate P for fulfilling the desired engine performance among plates P prepared in the state of having appropriately set lengths.

While the plate P has been described to have the shape as shown in FIGS. 4(a) to 4(e) in the above-described embodiment, the shape of the plate P is not limited to the shape shown, and may be appropriately selected as far as the shape displays the predetermined functions and effects of the present invention without departing from the gist of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An intake system for an internal combustion engine comprising:
   at least two intake valves;
   a passage through which a mixture of gas is supplied to each of said intake valves;
   a passage separating partition wall provided in said passage for supplying each said mixture of gas, respectively, to each of said intake valves;
   an intake port opening into which said mixture of gas is taken in so as to supply said mixture of gas into said passage; and
   a partition wall for bisecting said intake port opening, said partition wall being mounted in said intake port opening oppositely to said passage partition wall for supplying each said mixture of gas, respectively, to each of said intake valves, in such a manner as to be replaceable with another partition wall;
   a groove formed in an inner wall surface of said passage for receiving said partition wall, said groove being disposed at a predetermined disposition relative to said passage separating partition wall,
   there being a space between an edge of the partition wall and an edge of the passage separating partition wall.

2. The intake system for internal combustion engine as set forth in claim 1, wherein the partition wall for bisecting said intake port opening is composed of a plate of a predetermined length, the partition wall being replaceable in said intake port.

3. The intake system for internal combustion engine as set forth in claim 1, wherein said intake port through which a mixture of gas is supplied is of a predetermined length and said partition wall is of a predetermined length for extending within said intake port through which a mixture of gas is supplied.

4. The intake system for internal combustion engine as set forth in claim 3, wherein a plurality of partition walls are available for selectively positioning a selected partition wall within said passage through which a mixture of gas is supplied for varying the output characteristics of an internal combustion engine depending of the operator's desired output.

5. The intake system for internal combustion engine as set forth in claim 1, wherein said partition wall includes a straight surface with two substantially parallel edges extending therefrom and an arcuate curved section formed at a predetermined distance displaced from the straight surface.

6. The intake system for internal combustion engine as set forth in claim 5, wherein the predetermined distance displaced from the straight surface is formed to permit the partition wall to vary the operating characteristics of an internal combustion engine depending on the particular partition wall that is selected.

7. The intake system for internal combustion engine as set forth in claim 1, wherein the partition wall is formed of steel.

8. The intake system for internal combustion engine as set forth in claim 1, wherein the partition wall is stamped.

9. The intake system for internal combustion engine as set forth in claim 1, wherein the partition wall is formed of aluminum.

10. An intake system adapted to be used with an internal combustion engine comprising:
- at least two intake valves;
- an intake passage adapted to supply a mixture of gas to each of said intake valves;
- an intake passage separating partition wall provided in said intake passage for supplying a mixture of gas, respectively, to each of said intake valves;
- a flat partition wall for bisecting said intake passage, said partition wall being mounted in said intake passage oppositely to said intake passage separating partition wall for supplying a mixture of gas, respectively, to each of said intake valves, said flat partition wall being removably mounted within said intake passage; and
- grooves formed in an inner wall surface of said intake passage for receiving said flat partition wall, said grooves being disposed at a predetermined disposition relative to and being separated from said intake passage separating partition wall.

11. The intake system adapted to be used with an internal combustion engine as set forth in claim 10, wherein the flat partition wall for bisecting said intake passage is composed of a plate of a predetermined length, the flat partition wall being replaceable in said intake port.

12. The intake system adapted to be used with an internal combustion engine as set forth in claim 10, wherein said intake passage through which a mixture of gas is supplied is of a predetermined length and said flat partition wall is of a predetermined length for extending within said intake passage through which a mixture of gas is supplied.

13. The intake system adapted to be used with an internal combustion engine as set forth in claim 12, wherein a plurality of flat partition walls are available for selectively positioning a selected partition wall within said intake passage through which a mixture of gas is supplied for varying the output characteristics of an internal combustion engine depending of the operator's desired output.

14. The intake system adapted to be used with an internal combustion engine as set forth in claim 10, wherein said flat partition wall includes a straight surface with two substantially parallel edges extending therefrom and an arcuate curved section formed at a predetermined distance displaced from the straight surface.

15. The intake system adapted to be used with an internal combustion engine as set forth in claim 14, wherein the predetermined distance displaced from the straight surface is formed to permit the flat partition wall to vary the operating characteristics of an internal combustion engine depending on the particular partition wall that is selected.

16. The intake system adapted to be used with an internal combustion engine as set forth in claim 10, wherein the flat partition wall is formed of steel.

17. The intake system adapted to be used with an internal combustion engine as set forth in claim 10, wherein the flat partition wall is stamped.

18. The intake system adapted to be used with an internal combustion engine as set forth in claim 10, wherein the flat partition wall is formed of aluminum.

19. The intake system adapted to be used with an internal combustion engine as set forth in claim 10, wherein said flat partition wall consists of a straight surface with two substantially parallel edges extending therefrom and an arcuate curved section formed at a predetermined distance displaced from the straight surface, the two substantially parallel surfaces being fitted into said grooves along entire lengths thereof.

* * * * *